United States Patent [19]

Muskat

[11] 4,285,818
[45] Aug. 25, 1981

[54] PROCESS OF TREATING WASTEWATER WITH OXYGEN

[75] Inventor: Josef Muskat, Aarbergen, Fed. Rep. of Germany

[73] Assignee: Passavant-Werke Michelbacher Huette, Fed. Rep. of Germany

[21] Appl. No.: 47,062

[22] Filed: Jun. 11, 1979

[51] Int. Cl.³ .............................................. C02F 3/26
[52] U.S. Cl. .................................. 210/614; 210/629; 210/926
[58] Field of Search ...................... 210/7, 14, 15, 96.1, 210/614, 620–622, 629, 739, 926

[56] References Cited

U.S. PATENT DOCUMENTS

| | | | |
|---|---|---|---|
| 3,725,258 | 4/1973 | Spector et al. | 210/7 |
| 3,757,950 | 9/1973 | Zebley | 210/14 X |
| 3,964,998 | 6/1976 | Barnard | 210/7 |
| 4,159,243 | 6/1979 | Okey | 210/14 |

Primary Examiner—Thomas G. Wyse
Attorney, Agent, or Firm—Woodford R. Thompson, Jr.

[57] ABSTRACT

A process for treating wastewater with oxygen in which oxygen of a higher concentration than atmospheric oxygen is contacted at least intermittently with the water surface and introduced into the wastewater through agitation of the water surface. At least a part of the total volume of the wastewater is treated by carrying out alternately at least two of the following three modes of operation: (a) surface aeration of the wastewater using atmospheric air; (b) oxygenation while maintaining atmospheric pressure above the wastewater; and (c) oxygenation while maintaining positive pressure above the wastewater with the operating modes alternating with each other in response to variations in the volume and/or character of the wastewater being treated. The wastewater is circulated on a horizontal course and is exposed to the introduction of oxygen or oxygen-enriched air in one or several sections of its course whereas it is exposed to the atmosphere on the remainder of its course.

15 Claims, 10 Drawing Figures

PROCESS OF TREATING WASTEWATER WITH OXYGEN

BACKGROUND OF THE INVENTION

This invention relates to a process for treating wastewater with oxygen, wherein oxygen of a higher concentration than atmospheric oxygen is contacted at least intermittently with the water surface and introduced into the wastewater through an agitation of said water surface.

The use of pure oxygen or oxygen-enriched air instead of conventional aeration enables a considerable increase in efficiency of the activated sludge process for wastewater treatment, although the costs involved in oxygen supply are rather high.

Many methods and types of equipment for oxygenation are well known in the art to which our invention relates, such as disclosed in "Korrespondenz Abwasser" magazine, issue 1975, p. 278 to 287. These methods are carried out by either the introduction of fine oxygen bubbles adjacent the bottom of tanks which are open or covered by gas-tight means, or by supplying oxygen to a gas compartment defined by means of a cover above the wastewater wherein the oxygen is introduced into the wastewater by means of stirrers, surface aerators or similar equipment.

The prior method of supplying oxygen to the covered gas compartment usually requires that a positive pressure of 30 to 50 mm (water column) be maintained and the surplus gas be withdrawn from the compartment. Depending upon the volume and nature of the wastewater to be treated and hence on the oxygen demand, this surplus gas may still contain appreciable amounts of unused oxygen. On the other hand, optimum conditions for biological treatment of the wastewater cannot be achieved because the gaseous products, in particular $CO_2$, resulting from the metabolic process are unable to escape. While prior procedures are known for expelling such $CO_2$ in a subsequent stripping stage, such procedures require additional equipment and they do not achieve optimum operating conditions. Such procedures also involve a loss of oxygen and in addition thereto the residual $CO_2$ remaining in the water until being expelled interferes with an optimum biological balance being established. These disadvantages, in particular the loss of oxygen, which can hardly be prevented from escaping with the surplus gas, are particularly felt when volume and pollution of the wastewater deviate greatly from the normal values for which the plant is designed. A marked drop from such normal values will lead to unnecessarily high concentrations of oxygen in the wastewater and in the surplus gas, whereas a major increase beyond such normal values will result in an insufficient degradation of pollutants.

SUMMARY OF THE INVENTION

An object of my invention is to provide a wastewater treatment process which not only brings about thrifty use of oxygen but also achieves optimum cleaning efficiency and optimum adaptability of the plant to changing operating conditions.

This object is realized in accordance with my invention by providing for the cleaning of at least a portion of the wastewater to take place alternately in at least two of the following three operating modes or steps:

(a) Surface aeration of the wastewater using atmospheric air;
(b) Oxygenation while maintaining atmospheric pressure above the wastewater;
(c) Oxygenation while maintaining positive pressure above the wastewater.

These operating modes are made to alternate in response to variations in volume and/or character of the wastewater to be treated. Such alternation permits treatment to be adapted to the actual oxygen demand of the wastewater. That is, if the oxygen demand is high oxygenation takes place under positive pressure to supply the water with an extensive amount of oxygen which is completely used up in the biological process instead of the oxygen leaving the water unused. If, by contrast, the oxygen demand is low, oxygenation takes place under atmospheric pressure thus keeping the consumption of oxygen very low. If the pollution of wastewater is relatively low, oxygenation is discontinued altogether and replaced by surface aeration with atmospheric air.

In any of the above operating modes, an advantageous embodiment of the invention enables oxygenation or aeration to be so controlled as to maintain the oxygen content of the wastewater between a maximum and a minimum level ranging from 1.8 to 2.2 $mgO_2/l$. This range ensures optimum use to be made of the oxygen supplied. Operating modes are switched only when staying within the above limits is no longer possible or economical in the operating mode applied. Apart from the oxygen content of the wastewater, the oxygen concentration in the gas compartment is a criterion for switching operating modes.

The process of the present invention with its different operating modes is particularly advantageous if applied in accordance with a preferred embodiment of the invention, wherein the wastewater is circulated several times on a horizontal course while being passed through a gas-filled compartment defined by a cover and supplied with oxygen and wherein the wastewater is exposed to free atmosphere on the remainder of its circular path. This results in the advantage that the wastewater, which is in general understood to be a mixture of wastewater and activated sludge, passes several times through a reaction zone consisting of an oxygenation section and an open section where the carbon dioxide can escape from the water. This permits a balanced reaction to be achieved at optimum cleaning conditions and a relatively low oxygen concentration to be maintained in the wastewater. Accordingly, the relatively large quantities of oxygen introduced into the wastewater can be put to optimum use without causing uneconomical and too high an oxygen content in the wastewater. A further advantage of my process resides in its remarkable flexibility and adaptability to changing inflow rates and varying pollution of the wastewater being treated.

My invention also relates to equipment for implementing the above described process, which may comprise a basin, gas-tight cover means covering at least a portion of the wastewater surface in the basin, means for controllable introduction of pure oxygen or oxygen-enriched air into the compartment underneath the cover, at least one surface aerator and means for discharging gas from the space below the cover. The equipment of my invention comprises a sensing probe for measuring the oxygen content of the wastewater and another sensing probe for measuring the oxygen concentration in the gas compartment underneath the cover with there being a regulating and controlling device receiving signals emitted by the sensing probes and controlling the oxygen supply and gas withdrawal in response to these signals.

Preferably, the regulating and controlling device comprises a switching means having two operating positions. In one of these operating positions, a valve disposed in the gas discharge line is kept permanently open and a valve in the oxygen supply line is adjustable, whereas in the other operating position, the valve in the oxygen supply line is permanently open and the valve in the gas discharge line is adjustable.

The equipment of my invention also includes circulating means for setting up a horizontal circular flow of the wastewater and comprises either a section covered by the cover means or is connected with a basin equipped with cover means with connecting means in the form of inlet and outlet lines for a partial stream of the circulated wastewater.

DESCRIPTION OF THE DRAWINGS

Embodiments of my present invention are described in detail by reference to the accompanying drawings forming a part of this application in which.

DETAILED DESCRIPTION

Figure 2:
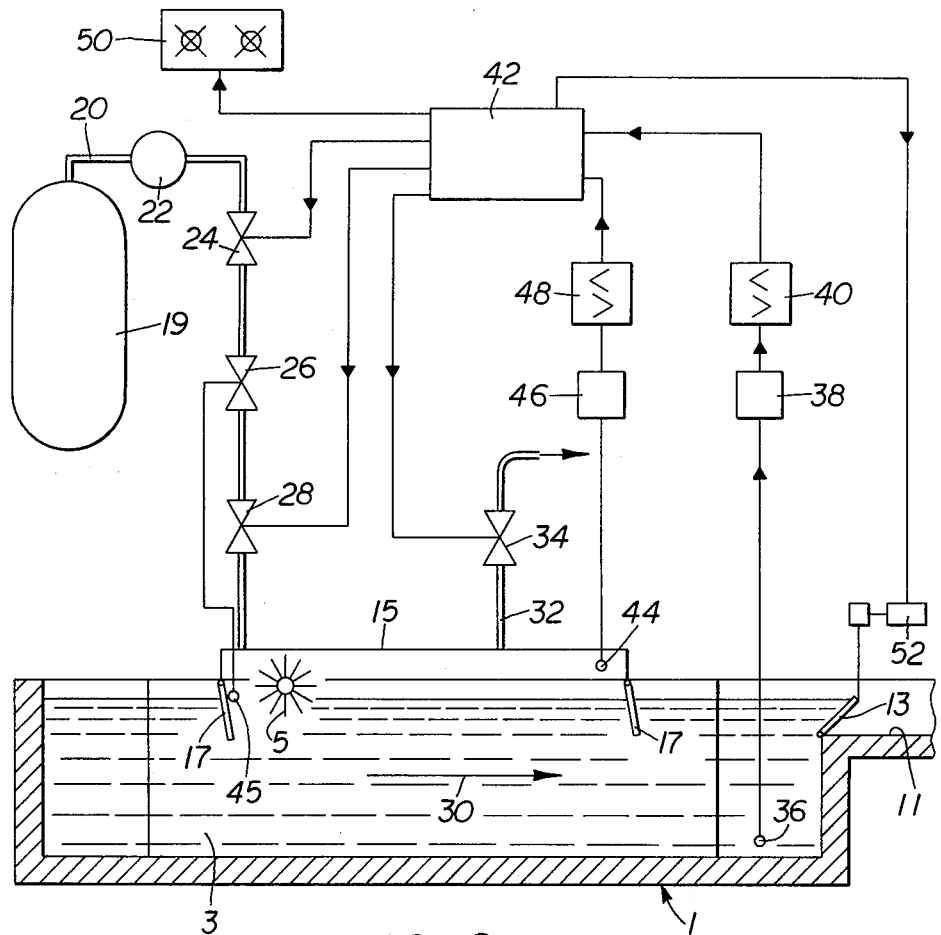
FIG. 2 is a sectional view taken along line 2—2 of FIG. 1 and showing an additional schematic of the regulating and controlling means.
Figure 1:
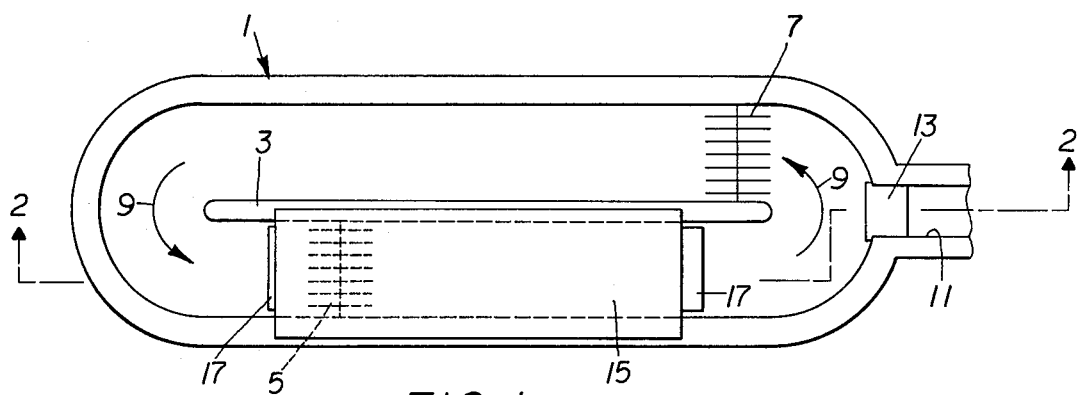
FIG. 1 is a schematic top view of equipment designed to implement the process of my invention in accordance with one embodiment thereof.

In FIGS. 1 and 2 the equipment is shown as comprising an annular basin 1 having a central partition 3 which is customary with conventional activation or oxydation channels. Arranged in the basin 1 are two horizontal aeration rotors 5 and 7 which set up a horizontal flow circulation in the basin 1 in the direction of arrows 9. The inlet for the wastewater to be treated is of the usual type not shown. The outlet is shown at 11 and is equipped with a height-adjustable weir 12 which permits adjustment of the water level in basin 1 and hence the immersion depth of aeration rotors 5 and 7.

A portion of the course on which the water circulates in basin 1 is covered by a gas-tight cover 15 having its longitudinal edges seated on the periphery of basin 1 and on the central partition 3. The ends of the cover 15 are equipped with movable flaps 17 which are adapted to be immersed in the water. The edges of the flaps 17 may be provided with suitable sealing lips or the like which ensures a gas-tight contact with the basin walls. The flaps 17 may be raised either manually or by suitable drive means, not shown, to a position clear of the water thus permitting access of air to the compartment or space below the cover 15. With the flaps 17 in the raised position, the surface aerators 5 disposed under cover 15 will implement surface aeration with atmospheric air as will the surface aerator 7 positioned outside the covered area. The flaps 17 which extend throughout the width of the cover 15 may be replaced by rigid end walls submerged in the water and equipped with movable sections, louvers or other similar sealable inlet openings for atmospheric air. The end walls may also be divided into rigid and movable portions.

A container 19 filled with pure oxygen communicates with a line 20 having a flowmeter 22 and valves 24, 26 and 28 therein. The line 20 extends into the gas compartment defined below the cover 15 to supply this compartment with pure oxygen which can be introduced into the water by surface aerator 5. A part of this oxygen introduced into the water in the form of bubbles will dissolve and part of the oxygen bubbles will surface again after having passed through a certain retention zone in the water. The cover 15 extends from the surface aerator 5 in the direction of the flow set by the aerator 5, as indicated by the arrow 30, and preferably throughout the retention zone of the gas bubbles. A discharge pipe 32 having a control or shutoff valve 34 therein communicates with the chamber below the cover 15 and extends upwardly from the cover 15 and permits surplus gas to escape into the atmosphere.

As shown in FIG. 2, a sensing probe 36 extends into the water in the basin 1 and measures the oxygen content of the water. The sensing probe 36 is connected by a test signal amplifier 38 to a threshold value type sensor 40 which operates like a two-step controller and compares the values received from the sensing probe 36 with selectable upper and lower limit values and then transmits such signals to a central regulating and controlling unit 42, with the difference in the signals depending on whether the oxygen content of the water deviates from the upper or lower limit value. Similarly the gas compartment below the cover 15 is provided with a sensing probe 44 which measures the oxygen concentration or partial pressure therein. This probe 44 is connected by a test signal amplifier 46 to a threshold value type sensor 48 which also operates like a two-step controller and transmits signals to the regulating and controlling unit 42. These signals also differ depending on whether the oxygen concentration in the gas compartment below cover 15 deviates from a lower or upper limit value. In addition, the gas compartment underneath the cover 15 is provided with a pressure sensing device 45 that controls the valve 26 in such a manner as to permit oxygen to be supplied at constant pressure through line 20 when valves 24 and 28 are open.

The controlling unit 42 is connected by suitable lines to valves 24, 28 and 34 and to an indicator unit 50 which indirectly controls the position of the movable flaps 17. Another control line extends from unit 42 to an adjusting motor 52 which controls the position of the weir 13.

OPERATING EXAMPLE

Figure 3:
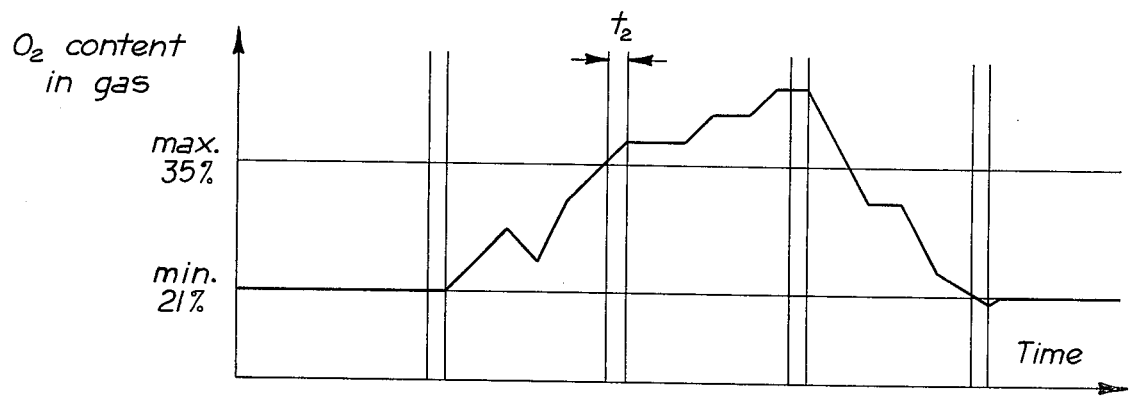
FIG. 3 shows flow charts of a typical sequence of the process of my invention.
Figure 3:
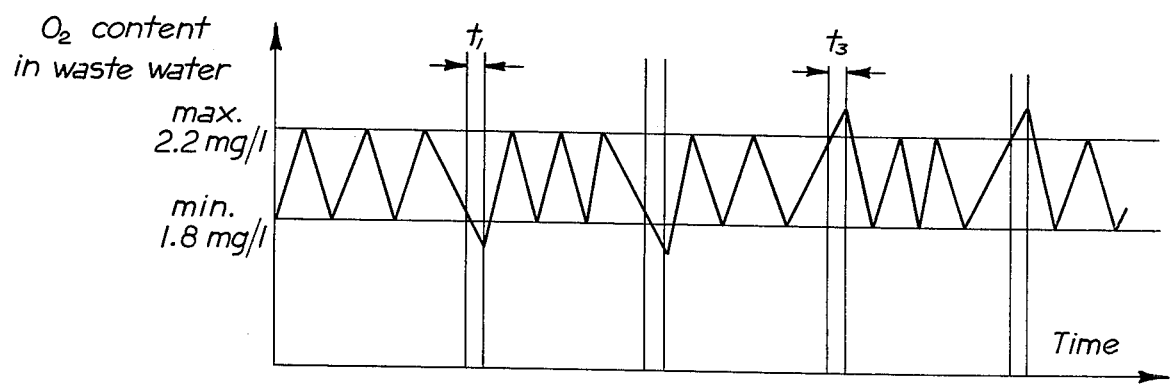
Figure 3:
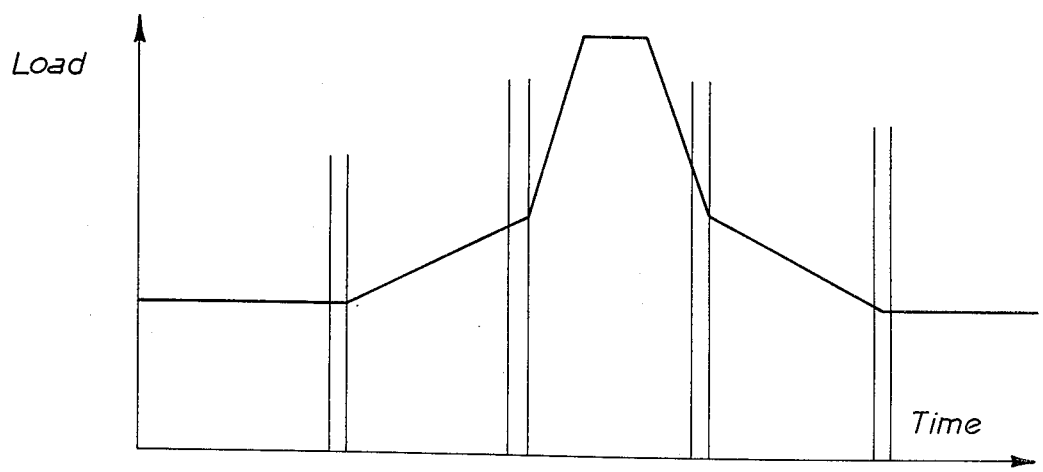

The operation of my equipment is described by references to the following example, with FIG. 3 representing a typical sequence of the process of my invention. The lower section of FIG. 3 shows a typical load diagram of the treatment system, with the load changing within a given period of time. That is, the diagram shows the temporary variations of the total amount of degradable pollutants delivered to the system per unit of time. The operating mode in which the plant actually works is indicated above the diagram. The curves in the top section of FIG. 3 show the oxygen content of the wastewater and the oxygen concentration in the gas compartment above the water during a given period of time.

(1) Surface aeration with atmospheric air

It is assumed that the wastewater to be treated has a relatively low degree of pollution, that is, a low chemical and/or biological oxygen demand ($COD_5$ and/or $BOD_5$). In this case, the flaps 17 of the cover 15 are open and valve 24 in the oxygen supply line 20 is closed. This may be indicated to the attendant by a green lamp lighting on the indicator unit 50. The wastewater is cleaned through surface aeration with the atmospheric air, while sensing probe 36 acting on the two-step controller 40, central control unit 42 and motor 52 controls the position of the weir 13 and hence the immersion depth of aerators 5 and 7 in such a manner as to ensure that aeration maintains the oxygen content of the wastewater within a range of from 1.8 mg/l to 2.2 mg/l.

(2) Oxygenation under normal pressure

When, during surface aeration with atmospheric air, the $O_2$ content of the wastewater drops below 1.8 mg/l and stays there for more than $t_1$, 15 minutes, even though the aeration rotors operate at maximum immersion depth, the probe 36, the two-step controller 40 and the control unit 42 act on indicator unit 50 in such a manner as to cause a red lamp to be lighted, which is a signal for the attendant to close the flaps 17. It will be understood and obvious that control unit 42 may also cause the flaps 17 to be closed by conventional automatic means. Morever, control unit 42 will in the above case initiate the following operations:
 (a) Adjust the position of weir 13 by means of motor 52 to a level most favorable to oxygenation;
 (b) Open oxygen control valve 24;
 (c) Open surplus gas valve 34;
 (d) Control by opening and closing oxygen supply valve 28 in response to changes in the oxygen content of the wastewater measured by probe 36, so as to maintain this oxygen content in a range from 1.8 to 2.2 mg/l.

To maintain this oxygen content in the wastewater, the oxygen concentration in the gas compartment below the cover 15 must be increased or reduced depending on the degree of pollution of the wastewater. If probe 44 indicates that the required amount of oxygen is already being introduced at an oxygen concentration of 21%, equivalent to that of normal air, or less, operation can be switched back to surface aeration with atmospheric air by discontinuing the introduction of oxygen and closing the flaps 17.

(3) Oxygenation under positive pressure.

When the probe 44 indicates that keeping up the desired oxygen concentration in the wastewater would require the oxygen content or oxygen partial pressure in the gas compartment underneath the cover 15 to exceed a maximum value of 35% by volume, the amount of oxygen escaping through surplus gas discharge line 32 would be so high as to render the process uneconomical. Therefore, when the oxygen concentration in the gas compartment underneath the cover 15 stays above 35% for longer than time $t_2$, which is 15 minutes, a signal transmitted by probe 44 and the two step controller 48 to central control unit 42 causes the latter to close control valve 34 and open oxygen supply valve 28 permanently with valve 24 also being open. Oxygen can now enter the gas compartment underneath the cover 15 until the pressure is reached which has been preselected at pressure regulating valve 26 and is measured by means of pressure sensing device 45 whereby the supply of oxygen can be discontinued. The total amount of oxygen is then introduced into the water. Also, in this operating mode, the oxygen content of the wastewater is controlled by means of the probe 36, and the two-step controller 40 acting on control unit 42 which in turn operates surplus gas discharge valve 34 in such a manner that the latter will be opened when the $O_2$ content of the wastewater drops below for instance 1.8 mg/l and closed when the $O_2$ content exceeds 2.2 mg/l. The positive pressure preselected at valve 26 can thus be held at 50 mm (water column) or, if necessary, may be adjusted differently with the immersion depth of the surface aerator 5 changing with the positive pressure.

(4) Return to oxygenation under normal pressure

When water pollution decreases again to a point where oxygenation under positive pressure causes the oxygen content to stay about 2.2 mg/l for longer than time $t_3$, 30 minutes, control unit 42 effects a switch-back to oxygenation under normal pressure by causing the surplus gas valve 34 to be permanently open and the oxygen supply valve 28 to be opened or closed by a two-step controller, whereby the oxygen content of the wastewater is restored to a range between two limiting values of 1.8 and 2.2 mg/l.

(5) Return to surface aeration with atmospheric air

When water pollution decreases even further, operation can be switched back again to surface aeration with atmospheric air, as mentioned earlier, to this end the oxygen supply is stopped and the flaps 17 are opened. Operation is controlled by lifting and lowering the weir 13.

In the example described, the system was assumed to operate under a typical, non-recurrent peak load corresponding to the lower curve shown in FIG. 3. It is also obvious that a load occurring at a different time will cause the sequence of the process to differ. This means that alternation of operating modes is not bound to take place in the sequence indicated, but that frequently only two operating modes will alternate. It will be understood that my invention is not limited to the embodiment described in detail. In particular the limiting values for oxygen concentration in the wastewater and/or gas compartment that determine the control and alternation of operating modes may be changed according to requirements and/or such varied factors as wastewater flow rate, proportion of return sludge, or external conditions such as season, time, temperature and the like may be considered in determining alternation of operating modes and control of operation.

The equipment described including the annular basin 1 may be a part of a total system, wherein the outlet 11 of annular basin 1 may be connected to a settling tank from where the activated sludge may be recycled to the annular basin 1. The process of the invention may, however, be applied to any system regardless of whether it includes sludge return facilities or not.

Figure 4:
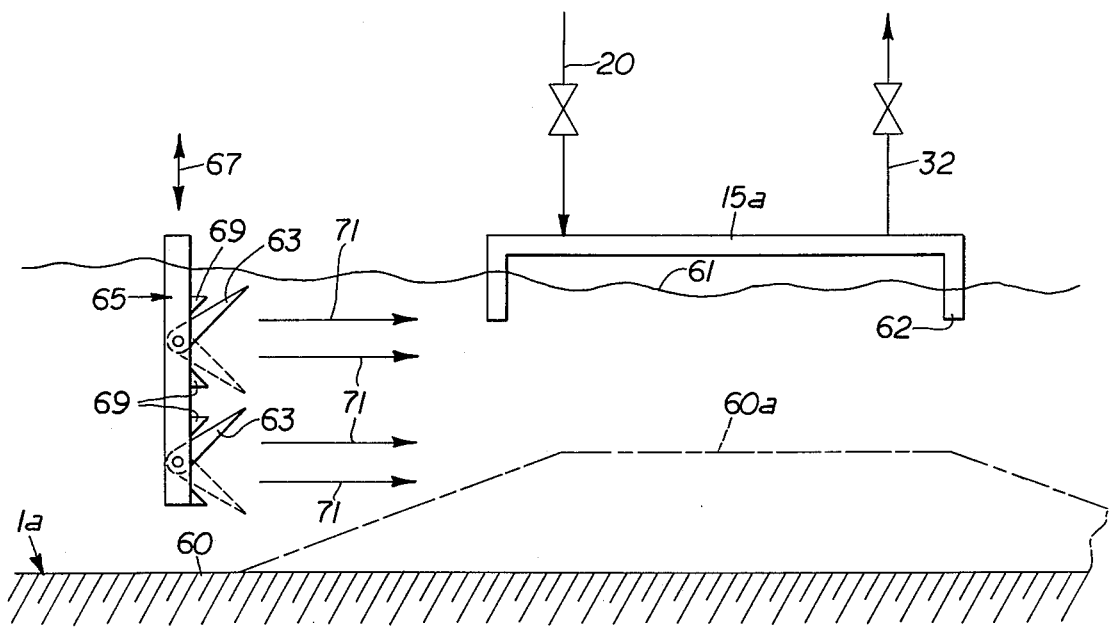
FIG. 4 is a schematic, longitudinal sectional view of an oxygenation basin containing propulsion means adapted for bubble-free operation.

Referring now to FIG. 4, reference numeral 60 indicates the bottom of an annular basin 1a which is partly covered by cover means 15a equipped with an oxygen supply line 20 and a gas discharge line 32 as described above relative to the cover 15. In the embodiment shown in FIG. 4 there is no surface aerator or similar gas introducing means. Instead, the oxygen is introduced through the water surface solely by rapid and sufficiently turbulent agitation of the water surface indicated at 61. To this end the water contained in the annular basin 1a must be circulated at a rate considerably higher than any of the customary flow rates required solely to prevent the sludge from settling out. The flow rate is essentially higher than 1 m/sec and preferably up to approximately 2 m/sec.

For setting up the flow and circulating of the wastewater it is of advantage to employ a propulsion means that will work in an essentially bubble-free medium, since a bubble-free medium can be recirculated using less energy than a medium containing bubbles. FIG. 4 shows such a propulsion means which is totally submerged in operation and consists of a number of paddles 63 which extend essentially throughout the width of the basin. One end of each paddle 63 is hingedly connected to supporting member 65 which is continuously moved up and down by suitable means in the direction of arrows 67. Stops 69 are carried by the support member 65 to ensure that the paddles 63 assume the upper solid line position when the support member 65 moves downward and the lower dotted line position when the support member 65 moves upward. Accordingly, as the support member 65 moves up and down, the paddles 63 function like the fins of a fish to thus set up an entirely bubble-free flow in the direction of arrows 71 and cause the water to pass at sufficiently high velocity below cover 15a.

To increase the flow rate of the wastewater within the covered area beneath cover 15a, this portion of the annular basin 1a may be equipped with internal structures which reduce its area as viewed by cross section. Such internal structures may consist of an elevated bottom portion 60a of the floor 60 as shown in dotted lines, or suitable structures extending inwardly from the side walls. Also, conventional type spoilers may be arranged adjacent the water surface to cause turbulencies in the wastewater. Also, the lower edge 62 of the front wall of cover 15a may be shaped like a comb, or similar combs or spoiler means may be arranged at other locations beneath the cover 15a.

Figure 5:
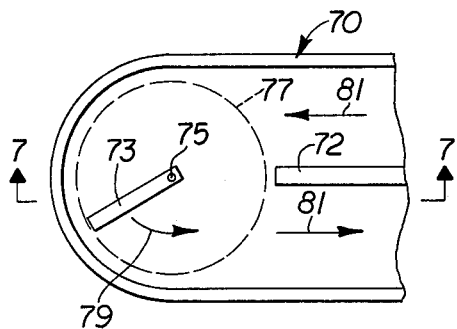
FIG. 5 and FIG. 6 are top views showing fragments of oval shaped basins with each having propulsion means of different configurations and adapted for bubble-free operation.
Figure 6:
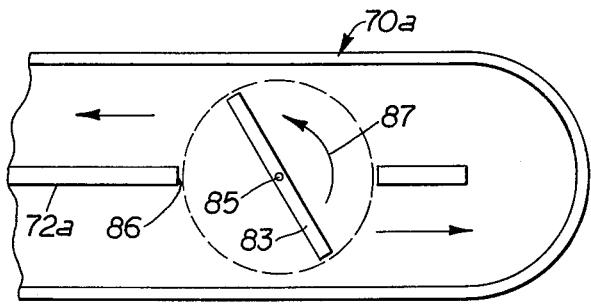
Figure 7:
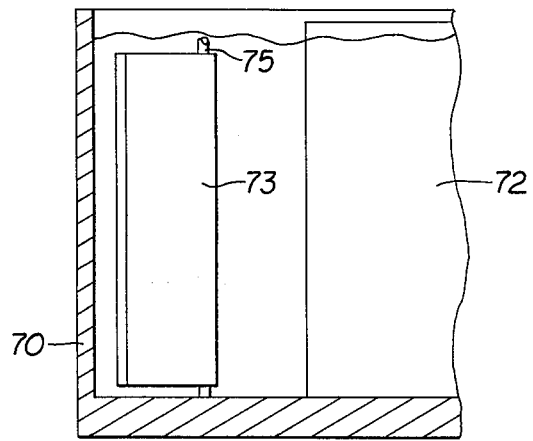
FIG. 7 is a vertical sectional view taken generally along the line 7—7 of FIG. 5.

Other ways of setting up an essentially bubble-free flow in the wastewater with the aid of totally submerged propulsion means are shown in FIGS. 5 and 6. As shown in FIG. 5 an oval shaped basin 70 is divided into two straight sections by means of a partition 72. A rotor 73 is arranged in the curved portion of basin 70 with the rotor consisting essentially of a single perpendicular paddle which rotates about a vertical axis 75 and covers substantially the entire cross section of the basin 70. The partition 72 extends to the circumference of the circle 77 defind by the path of movement of the outer edge of paddle 73. This causes the circular flow set up by paddle 73, as indicated by arrow 79, to be changed into a linear flow moving longitudinally of the basin 70 as indicated by arrows 81. It will be obvious that the rotor may comprise several paddles 73. These paddles may assume various well known forms such as being in the form of narrow ledges extending in a vertical plane and being equally spaced from each other on the periphery of a circle. To increase their efficiency, such paddles may be mounted on a conventional supporting cage so as to be rotatable about a vertical axis and they may also be controlled by means of conventional steering levers and cams so as to move radially to the direction of flow upon each rotation thereof through a 180° circular arc section of basin 70 and transversally of the direction of flow when passing through the two remaining sections. This makes their entire surface area effective rather than only their projected area. It is important that the rotor be entirely submerged as shown in FIG. 7 and that it functions only as a propulsion means and not as a surface aerator.

As shown in FIG. 6, the same effect is achieved by a rotor 83 which consists of a paddle centrally mounted and driven for rotation about a vertical axis 85. Rotor 83 is mounted within a gap 86 of a partition 72a of a basin 70a and rotates in the direction of arrow 87 and also sets up a circular flow. As another way of intensifying and equalizing the circular flow, the end section of partition 72a that is disposed adjacent the rotor can be bent or deflected so as to make the end of the partition more or less tangential to the circumference of the rotor whereby it extends opposite the direction of rotation of the rotor, on the downstream side thereof.

Figure 8:
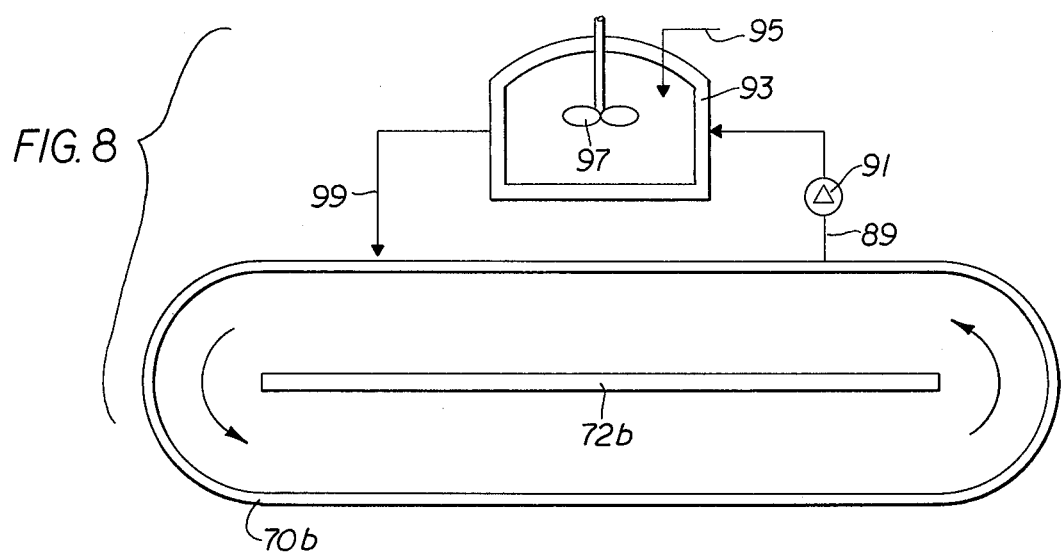
FIG. 8 is a schematic top view of a flow chart showing a modified implementation of the process of this invention.

In the embodiment shown in FIG. 8, the wastewater-activated sludge mixture is circulated on a horizontal path in a basin 70b equipped with a partition 72b. The propulsion means required for this purpose are not shown but may be of a construction similar to that shown in FIGS. 4 to 7. It will be understood that other propulsion means may be used instead of surface aerators, propellers or similar means. From basin 70b a line 89 having a pump 91 therein is branched off to divert part of the wastewater and introduce it into an oxygenation tank or compartment 93 supplied with pure oxygen by means of a line 95, with the oxygen being introduced into the wastewater by means of a stirrer 97. If a sufficiently high oxygen partial pressure can be maintained in the gas compartment of the basin, the oxygen content of the wastewater may amount to approximately 50 mg/l. This wastewater which is highly saturated with oxygen is recycled to the annular basin 70b by line 99 and mixed with the wastewater circulated in the basin 70b. The proportion of the diverted partial flow to the total wastewater volume circulated in the basin 70b is so selected as to obtain an oxygen concentration of approximately 2 mg/l in the basin 70b, which is an oxygen concentration most favorable for economical cleaning conditions. This application of the method of my invention has the advantage that the wastewater circulated in the annular basin 70b is absolutely free of bubbles, which saves energy, and that the desired oxygen concentration can easily be maintained in the basin 70b simply by regulating the quantity of wastewater diverted from the main body by means of line 89 and in particular by regulating the delivery rate of pump 91.

Figure 9:
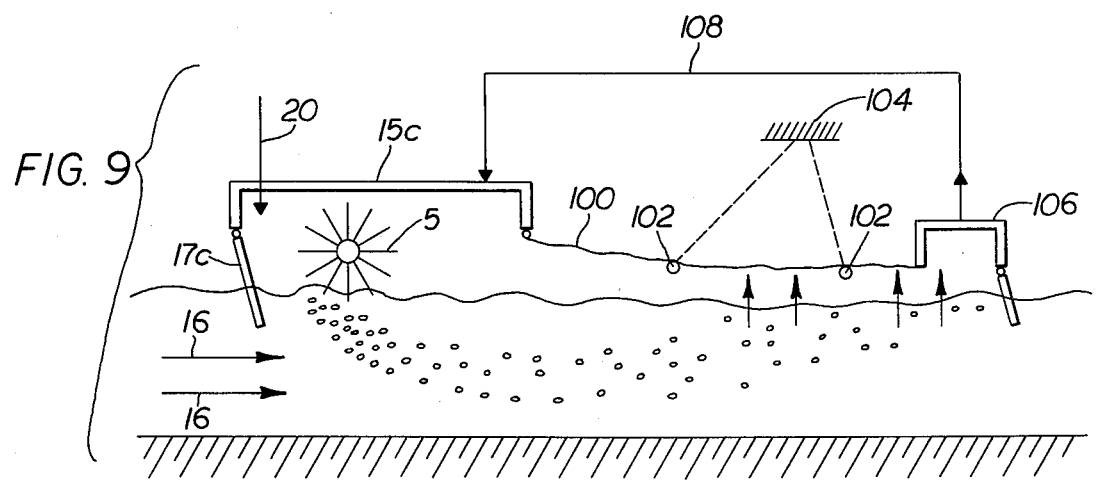
FIG. 9 is a longitudinal sectional view of an oxygenation basin having a modified form of cover means.

FIG. 9 shows a particularly simple and inexpensive means for obtaining a gas-tight cover for the water surface, with the cover extending from a surface aerator 5 throughout a sufficiently large area. In this arrangement, which is substantially identical to that shown in FIG. 2, a rigid cover 15c extends only over a relatively short section above the surface aerator 5 thus introducing the oxygen supplied by the line 20 into the wastewater. The wastewater is circulated in the direction of arrows 16. The front end of cover 15c is equipped with a flap 17c which is submerged in the wastewater, whereas the downstream end of cover 15c is connected to a flexible member 100, such as a rubber mat which floats directly on the water surface and covers an area of the water surface corresponding to the gas bubble retention zone that extends from the surface aerator 5. The longitudinal edges of the flexible cover or rubber mat 100 can be fitted with suitable flaps, ledges or the like which are submerged in the water. The rubber mat 100 can be supported on floats 102 or may simply float on the gas escaping from the wastewater and accumulating underneath the mat. A suspension means 104 for the rubber mat 100 prevents the mat from sinking below the water surface when the equipment is idle. One end of the flexible cover or rubber mat 100 is fitted with a pocket 106 which collects the undissolved oxygen that escapes from the wastewater. The pocket 106 is connected to the gas compartment underneath cover 15c by means to a recycling line 108.

Figure 10:
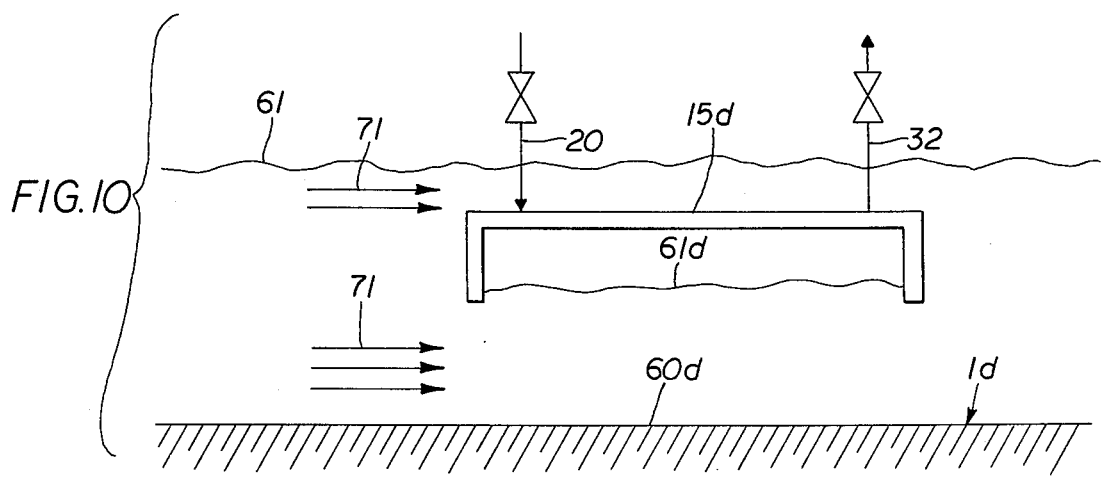
FIG. 10 is a schematic, longitudinal sectional view showing a further modification with the illustration being similar to that of FIG. 4.

Similar to FIG. 4, FIG. 10 shows the bottom 60d of an annular basin 1d wherein the wastewater is circulated in the direction of arrows 71 by suitable propulsion means, not shown. In this embodiment cover 15d including oxygen inlet line 20 and discharge line 32 is arranged in the form of a diving bell below the water surface 61. The positive pressure of the introduced gas enables a free surface 61d to be maintained under the diving bell. The increased pressure permits introduction of oxygen to be intensified and/or to be carried out at flow rates and turbulencies superior to those obtained at the surface 61.

While I have shown by invention in several forms, it will be obvious to those skilled in the art that it is not so limited, but is susceptible of various other changes and modifications without departing from the spirit thereof.

What I claim is:

1. In a process for treating wastewater with oxygen, wherein oxygen of a higher concentration than atmospheric oxygen is contacted at least intermittently with the water surface and introduced into the wastewater through an agitation of said water surface, the improvement comprising the treatment of at least part of the total volume of a circulating horizontal course of the wastewater by carrying out alternately at least two of the following three modes of operation:
   (a) surface aerating the wastewater using atmospheric air,
   (b) oxygenating the wastewater in at least one section of said course under a gas-filled compartment defined by a cover over said one section while maintaining atmospheric pressure above the wastewater under said compartment, and
   (c) oxygenating the wastewater in said one section of said course under said compartment while maintaining positive pressure above the wastewater under said compartment, with the operating modes alternating with each other in response to variations in the oxygen content of the wastewater and/or the oxygen concentration in said gas-filled compartment with the wastewater beng exposed to the introduction of gas only in said one section of said course and being exposed to the atmosphere on the remainder of said course and with said one section being the only part of said course covered by a cover and the wastewater is retained in said course for a period sufficiently long to allow the volume of said wastewater to pass beneath said cover several times, and wherein in any of the operating modes carried out the introduction of oxygen and air into the water is controlled by control means to maintain the oxygen content of the wastewater within a range defined by a preselected upper limit and a preselected lower limit.

2. The process as defined in claim 1 in which during oxygenation under atmospheric pressure only such quantities of oxygen or oxygen-enriched air are admitted and only such quantities of surplus gas escaping from the wastewater are withdrawn as to prevent the pressure above the wastewater from rising above atmospheric pressure.

3. The process as defined in claim 1 in which oxygenation under positive pressure is carried out so that the oxygen is supplied under constant pressure and the oxygen content of the wastewater is regulated by controlling the withdrawal of gas from the space above the wastewater.

4. The process as defined in claim 1 in which alternation of operating modes is initiated only when the oxygen content of the wastewater and/or the oxygen concentration in the gas-filled compartment above the water level remains above said preselected upper limit or below said preselected lower limit for longer than a preselected period of time.

5. The process as defined in claim 4 in which whenever the oxygen content of the wastewater stays below said lower limit for more than 15 minutes, surface aeration with atmospheric air is discontinued in favor of oxygenation under atmospheric pressure, and whenever in this oxygenation mode the oxygen concentration in the gas-filled compartment required to keep the oxygen content of the wastewater above said lower limit drops itself below said lower limit operation is switched back to surface aeration with atmospheric air.

6. The process as defined in claim 4 in which oxygenation under atmospheric pressure is discontinued in favor of oxygenation under positive pressure whenever the oxygen concentration in the gas-filled compartment above the wastewater stays above the upper limit for more than 15 minutes, and that operation is switched back from oxygenation under positive pressure to oxygenation under atmospheric pressure whenever in the former mode the oxygen content of the wastewater stays above the upper limit for more than 30 minutes.

7. The process as defined in claim 1 in which said lower limit for the oxygen content of the wastewater that initiates control and/or alternation of operating modes is 1.8 mg/l, while said upper limit is 2.2 mg/l.

8. The process as defined in claim 1 in which said lower limit for the oxygen concentration in the gas-filled compartment above the wastewater that initiates alternation of the operating modes is 21% while the upper limit is 35%.

9. The process as defined in claim 1 in which surface aeration with atmospheric air is carried out in the portion of the course that is provided with a cover and that for this purpose the cover is opened or removed to enable access of atmospheric air.

10. The process as defined in claim 9 in which surface aeration is also carried out outside of the covered area.

11. The process as defined in claim 1 in which the gas is fed under pressure beneath said cover in the form of a diving bell arranged below the water surface to provide a free water surface underneath said cover which can absorb oxygen.

12. The process as defined in claim 11 in which the wastewater is passed below said cover at a flow rate several times higher than that required to prevent the sludge from settling out so that it is this flow that effects the introduction of oxygen.

13. The process as defined in claim 12 in which said flow rate exceeds 1 m/sec.

14. The process as defined in claim 13 in which said flow rate is 2 m/sec.

15. The process as defined in claim 1 in which the wastewater is circulated on said horizontal course by propulsion means which operates exclusively below the surface of the water and introduces essentially no gas bubbles.

* * * * *